Figures 1, 2:
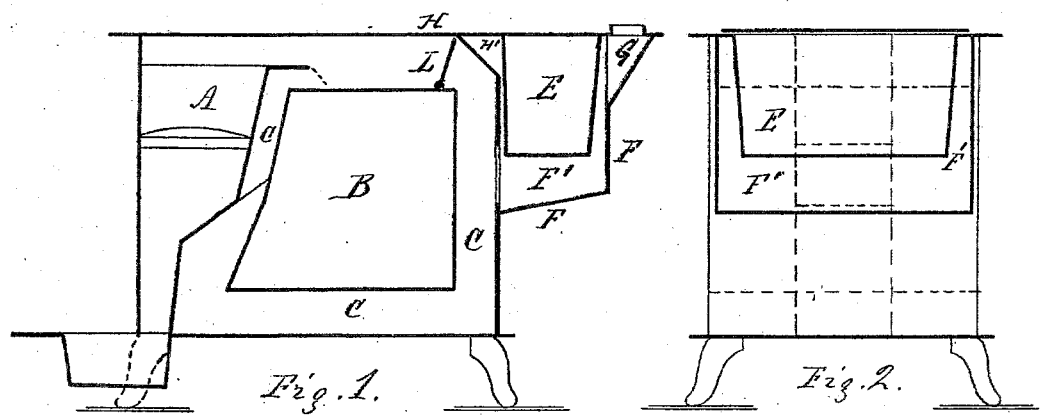

3 Sheets--Sheet 1.

R. M. HERMANCE.
Cooking-Stoves.

No. 130,045. Patented July 30, 1872.

Witnesses.
B. F. Packard
Edmund Masson

Inventor.
Richard M. Hermance
By atty. A. B. Stoughton.

3 Sheets--Sheet 2.

R. M. HERMANCE.
Cooking-Stoves.

No. 130,045.  Patented July 30, 1872.

Witnesses.
B. F. Packard
Edmund Masson

Inventor
Richard M. Hermance.
By atty A. B. Stoughton.

3 Sheets--Sheet 3.

R. M. HERMANCE.
Cooking-Stoves.

No. 130,045.                              Patented July 30, 1872.

Witnesses.
B. F. Packard
Edmund Masson

Inventor
Richard M. Hermance,
By atty A. B. Stoughton.

UNITED STATES PATENT OFFICE.

RICHARD M. HERMANCE, OF TROY, NEW YORK, ASSIGNOR TO J. B. WILKINSON, OF SAME PLACE.

IMPROVEMENT IN COOKING-STOVES.

Specification forming part of Letters Patent No. 130,045, dated July 30, 1872.

*To all whom it may concern:*

Be it known that I, RICHARD M. HERMANCE, of the city of Troy, county of Rensselaer and State of New York, have invented certain new and useful Improvements in Cooking-Stoves; and I hereby declare that the following is a full, clear, and exact description of the same, reference being had to the accompanying drawing and the letters of reference marked thereon, which drawing is made a part of this specification.

The nature of my invention, as embodied in this application, consists, first, in placing a water-tank, reservoir, or other culinary vessel through the top plate of the stove into a chamber formed outside and back of the rear vertical end plate of a diving-flue cooking-stove, the walls of said chamber inclosing the said reservoir, and an opening or openings through the rear vertical end plate of the stove, admitting the products of combustion from the rear vertical flue or flues into said chamber so as to heat the reservoir and its contents by the products of combustion on their way to the exit-pipe. It further consists in such combination of an old device (lip or flange) between the walls composing the casing and the reservoir that the reservoir is supported or sustained on said casing. It further consists in constructing a diving-flue cooking-stove with the exit-flue continued outward beyond the back walls of the stove, and expanded or formed so as to inclose on the sides and bottom a water tank or reservoir, so that the same may be heated by the escaping products of combustion, either by direct or reversed draft on their way to the exit-pipe. It further consists in the combination of a reservoir, fixed or portable, with a casing or hot-air chamber, as will be hereinafter more fully described. It further consists in the employment of flue-strips in combination with a reservoir and casing, for the purpose of guiding and controlling the currents of heated air. It further consists in continuing outward and downward the upper sheet-flue of the stove, through and beyond the rear vertical plate thereof, between a reservoir and the back of a stove, so that a reservoir may be heated by direct contact of the products of combustion in direct draft. It further consists in perforations or the equivalent thereof in the upper edge or part of a water-reservoir in combination with a chamber for the passage of steam from the reservoir into the flues or chamber. It further consists in the formation of one or more dead-air chambers surrounding a reservoir when inclosed with a casing, for the purpose of preventing the cooling of the reservoir by the contact of outer or cold air, which would rob it of its heat, the said dead-air chamber intervening and acting as a non-conductor while assisting in heating the said reservoir by holding heated air in contact therewith.

*Description of the Accompanying Drawing.*

There are three sheets, marked, respectively, Sheet I, Sheet II, and Sheet III.

Figures 3, 4:
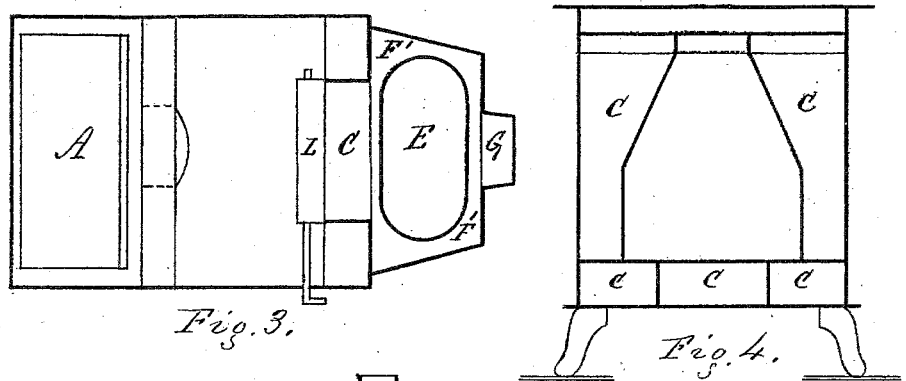
Figures 5, 6:
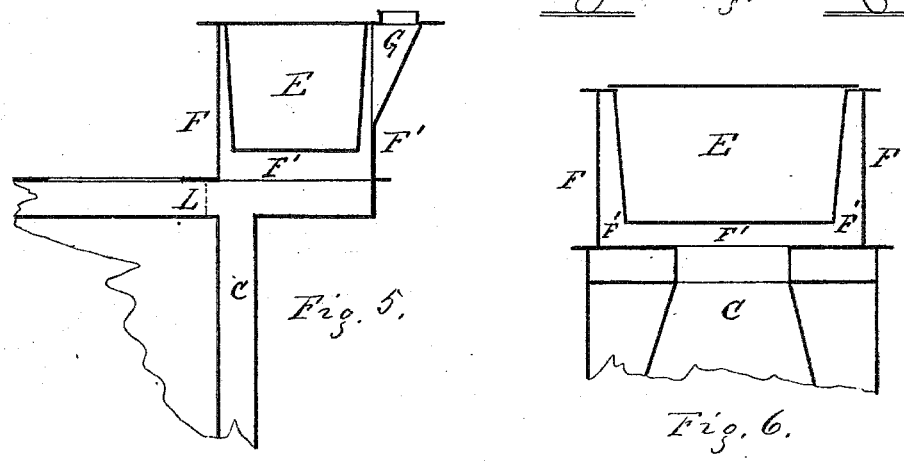
Figure 7:
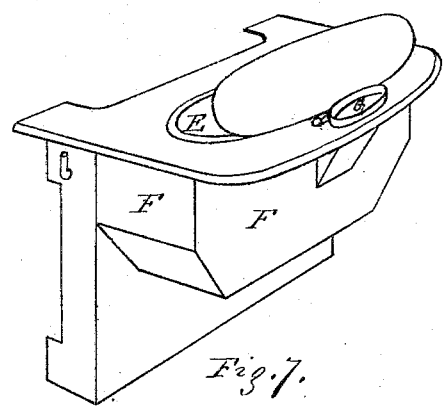
Figure 8:
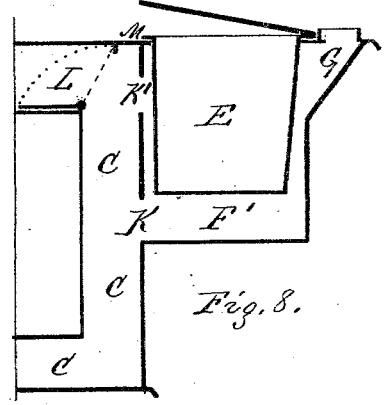
Figure 9:
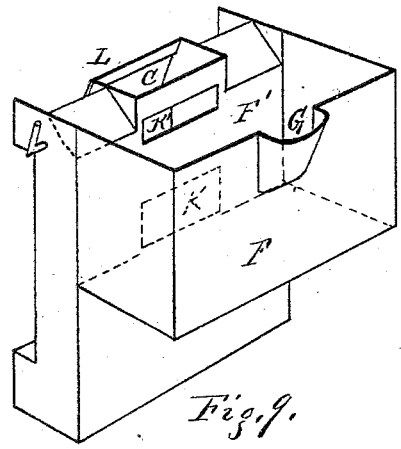
Figure 10:
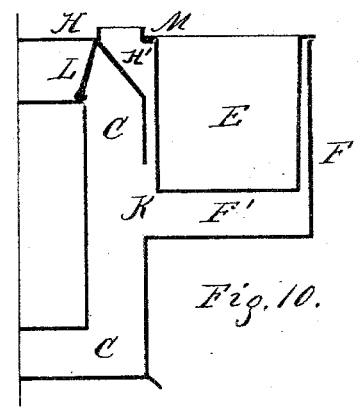
Figure 11:
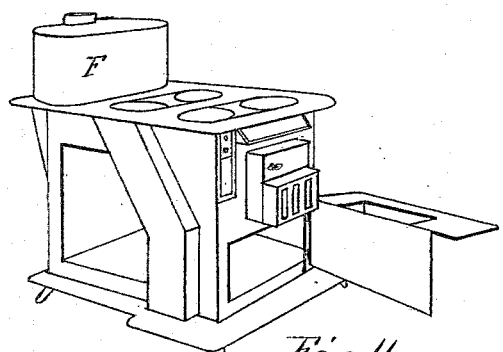
Figure 12:
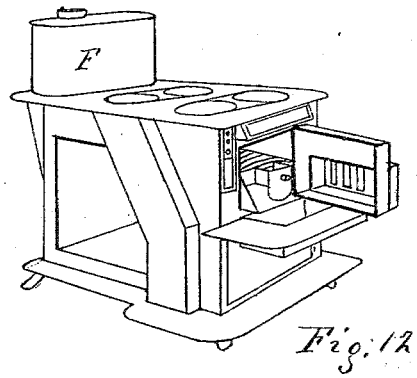
Figure 13:
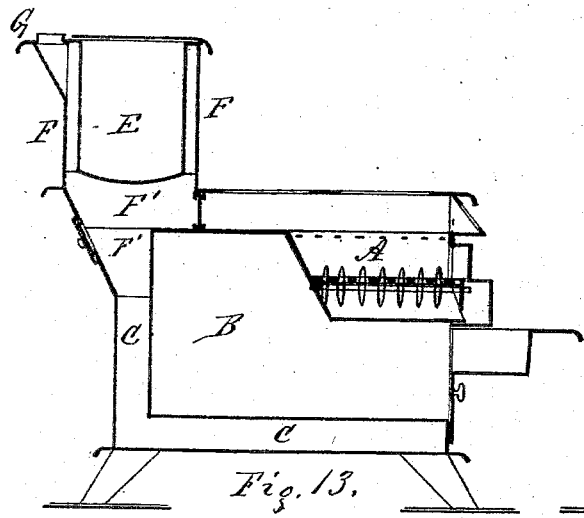
Figure 14:
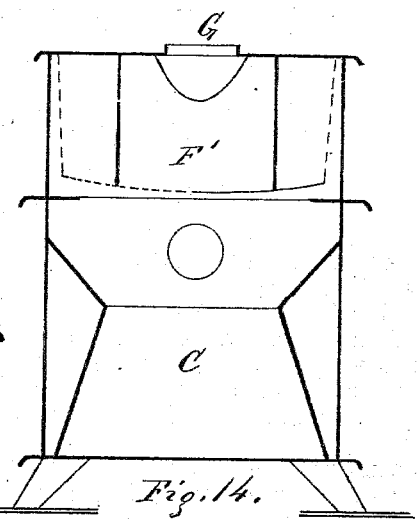
Figure 15:
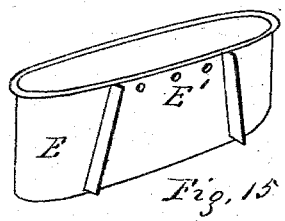
Figure 16:
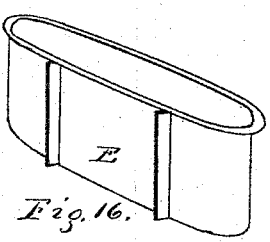
Figure 17:
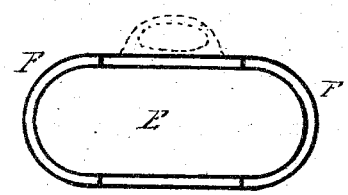
Figure 18:
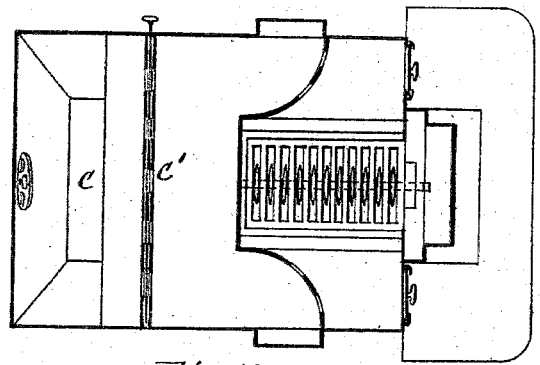
Figure 19:
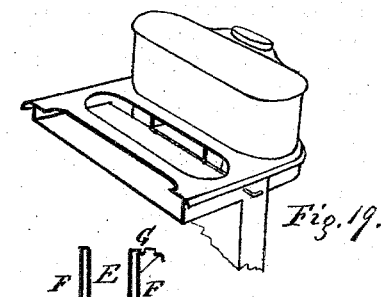
Figure 20:
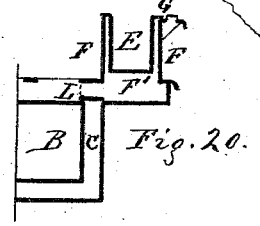

Figure 1 represents a vertical lengthwise section, with a water reservoir or tank shown inside of a chamber or flue-space, the back plate of the stove having apertures to admit hot air and the products of combustion to said chambers and the exit-pipe, shown back of the reservoir. In this figure the descending flues of the stove are shown in front of the oven, and but one aperture in the back plate. Fig. 2 represents a vertical transverse section of the reservoir and chamber, looking toward the stove-back plates, the position of the flues shown by dotted lines representing flue-strips. Fig. 3 is a horizontal section of a stove above the top oven-plate, the fire-box running transversely, the descending flues in front, and the pipe collar or exit located in the casing behind the reservoir. Fig. 4 represents a transverse vertical section of the stove through the front or descending flues. Fig. 5 is a longitudinal section of the rear part of a stove having a reservoir or tank placed into a chamber, formed and located above or partially above the top of the stove, the exit-aperture located within the casing of the reservoir and behind the same. Fig. 6 is a transverse vertical section of the same construction through the reservoir-chamber and casing and the upper part of the rear vertical flue of the stove. Fig. 7 is a perspective view of the rear end of a stove, having a chamber or flue-space located behind the same, similar in general to Fig. 1, the pipe or exit-opening behind the reservoir. Fig. 8 is a longitudinal vertical section of the same construction, except that there are two openings through the rear vertical plate of the stove to admit the products of combustion from the flues into the chamber. The upper aperture is so located as to get the benefit of the direct draft and the lower one the reversed draft in heating the reservoir. Fig. 9 is a perspective view of the rear end of a stove supposed to have three rear vertical flues, and two openings are shown leading from the center flue into the reservoir-chamber, which is located as shown in Fig. 8. The top plate of the stove is removed to show the interior construction. Fig. 11 is a stove in perspective. A cased reservoir is located above the top of the stove. The front hearth, with an ash-pit, forms a door, which is shown open, exhibiting the front of the oven. Fig. 12 is a similar perspective view of the same stove. The hearth-door is closed and the front door to the fire-pot is open. Fig. 13 is a longitudinal section of a stove as shown in Figs. 11 and 12. A reservoir is located above the top of the stove, its chambers extending downward below the top plate and the top oven-plate of the stove. The back plate of the stove is bent backward to inclose the lower part of the chamber. The pipe-collar is located back of the reservoir. A sliding damper is shown at the front of the reservoir-chamber for permitting the products of combustion to enter said chamber at pleasure. There are flue-strips for guiding the currents as part of the reservoir; also there are descending flues in front. Fig. 14 is a transverse vertical section of the same through the rear vertical flue, and between the reservoir and the back wall of the reservoir-casing, looking toward the rear. Fig. 15 is the reservoir in perspective, showing the flue-strips and the perforations for the exit of the steam. Fig. 16 is the reservoir in perspective viewed from the opposite side. Fig. 17 is a horizontal section of the reservoir-chamber and casing; also the flue-strips, showing the divisions caused thereby. Fig. 18 is a horizontal section of a stove, shown in Fig. 13, on a line just above the top oven-plate, the descending flues in front, the lower portion of the expanded flue or reservoir-chamber exposed; also a sliding damper, fire-pot, &c. Fig. 19 is a perspective view of a rear portion of a three-flue stove. A cased reservoir is located above the top plate and wholly behind the vertical line of the back plate. The pipe-collar is located behind. Fig. 20 is a vertical longitudinal section of the same. A damper is shown as when falling back over the rear center vertical flue.

Like letters refer to like or corresponding parts.

In Figs. 1, 2, 3, 7, 8, 9, my reservoir and chamber are shown as having their tops level with the top plate of the stove and formed wholly below the same. A casing is formed by the walls F, inclosing the chambers $F^1$, into which the reservoir or tank E is placed through an opening, M, in the top plate of the stove, extending, or in any suitable top plate, over the casing and chamber, a flange at the top of the reservoir, resting on the top plate, supporting the same. At K I have an opening through the rear vertical end plate of the stove, so that the products of combustion may enter from the center flue into the chamber $F^1$; and I usually locate the exit-pipe collar opening at G behind the reservoir, so that the products of combustion may pass around the reservoir, heating the same, and then escape; and for the purpose of shortening the course of the direct draft and to allow the heat to strike directly against the walls of the reservoir in front, thereby getting the benefit of the heat otherwise wasted in kindling. I form another opening at K', higher up than the bottom of the reservoir, which, in this case, forms, practically, an extension of the upper sheet-flue of the stove out into the reservoir-chamber, either around the upper part thereof, or, when using the style of reservoir shown in Figs. 15 and 16, down the front of the reservoir, between it and the back wall of the stove, underneath the bottom and up the back to the exit-collar G, the heat in direct draft passing through the opening K', and in reverse draft; or, after passing under and heating the oven of the stove, the heat passes through the apertures K into the reservoir-chamber F', in both cases utilizing the products of combustion in heating the reservoir. The rim of the reservoir may rest upon the top or upper edge of the walls forming the casing F, as shown in Figs. 5, 6, 13, and 20. Although I prefer placing the exit-opening or pipe-collar behind the reservoir, it may be placed in front without materially changing the principle of construction or heating; a forward bend of the back plate of the stove, extending the reservoir-chamber forward, is sufficient for the purpose. At L is a damper, by the opening and closing of which the draft is admitted to, or excluded from, the rear vertical ascending flue C of said stove. A is the fire-box of the stove. B is the oven. My reservoir can be readily lifted out from the chamber F' for the purpose of cleaning its interior, or the interior of the chamber or flue-space, or for setting on the top of the stove, if required, for cooking or washing purposes, and also to admit of the placing of other culinary boilers in said chamber, if required. At E' are shown perforations, or the equivalent thereof, to admit the escape of steam into the flues. At C' is shown a sliding damper, separating the reservoir heating-chamber of Figs. 13 and 18 from the upper sheet-flue of the stove, which, when open, admits the products of combustion to escape in that way to heat the reservoir.

In Figs. 15, 16, and 17 are shown strips projecting from the reservoir, which, when the reservoir is within the casing, fit closely, so as to confine the moving currents of heat, and also to divide up the space into dead-air chambers when required.

What I claim as my invention, and desire to secure by Letters Patent, is—

1. The employment of a reservoir in combination with a hot-air chamber or casing, the said reservoir suspended or sustained by the top plate of the stove or walls of the casing, with an opening through or removal of a part of the vertical end plate above the lower oven-plate into the back flues of the stove.

2. I further claim a diving-flue cooking-stove with the exit-flue formed, constructed, or expanded as described, so as to inclose on the sides and bottom the tank, reservoir, or other culinary vessel.

3. I further claim the construction of the several parts herein described for the heating of a portable or fixed reservoir set into an expanded flue or hot-air chamber, located back of the vertical end plate, as hereinbefore described and set forth, the rear vertical plate of said stove forming one side of a casing within which said chamber is formed.

4. I further claim two strips in combination with an elevated reservoir and casing for the purpose of guiding and controlling the heated currents on their way to the exit-pipe.

5. I further claim the openings or perforations E' through the upper part or edge of a water-reservoir E, in combination with the chamber F', substantially as and for the purpose described and set forth.

6. I further claim one or more dead-air chambers in combination with an elevated reservoir and casing, for the purpose of preventing direct contact of the outer and cold air with the same, so as to rob it of its heat, thereby cooling its contents.

7. I further claim the sustaining or supporting of a water-reservoir by the upper edge of the vertical walls of a casing.

RICHARD M. HERMANCE.

In presence of—
E. W. STOK,
P. J. MARSH.